March 16, 1965

L. W. BURFIEND 3,173,644

SAFETY PROP

Filed Nov. 29, 1962

Lloyd W. Burfiend
INVENTOR.

BY *Clarence A. O'Brien*
*and Harvey B. Jackson*
Attorneys

United States Patent Office 3,173,644
Patented Mar. 16, 1965

3,173,644
SAFETY PROP
Lloyd W. Burfiend, 607 S. 2nd St., Tumwater, Wash.
Filed Nov. 29, 1962, Ser. No. 240,859
6 Claims. (Cl. 248—356)

This invention relates to new and useful improvements in safety props particularly but by no means necessarily, for use in motor vehicle repair or maintenance shops and has for its primary object to provide, in a manner as hereinafter set forth, novel means for positively supporting a dump body in raised position while a mechanic is working therebeneath.

Another important object of the present invention is to provide a safety prop of the aforementioned character which is readily adjustable to meet various conditions.

Still another highly important object is to provide an improved safety prop or post of the character described which may be expeditiously installed by a single person.

Other objects are to provide a safety prop of the character set forth which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
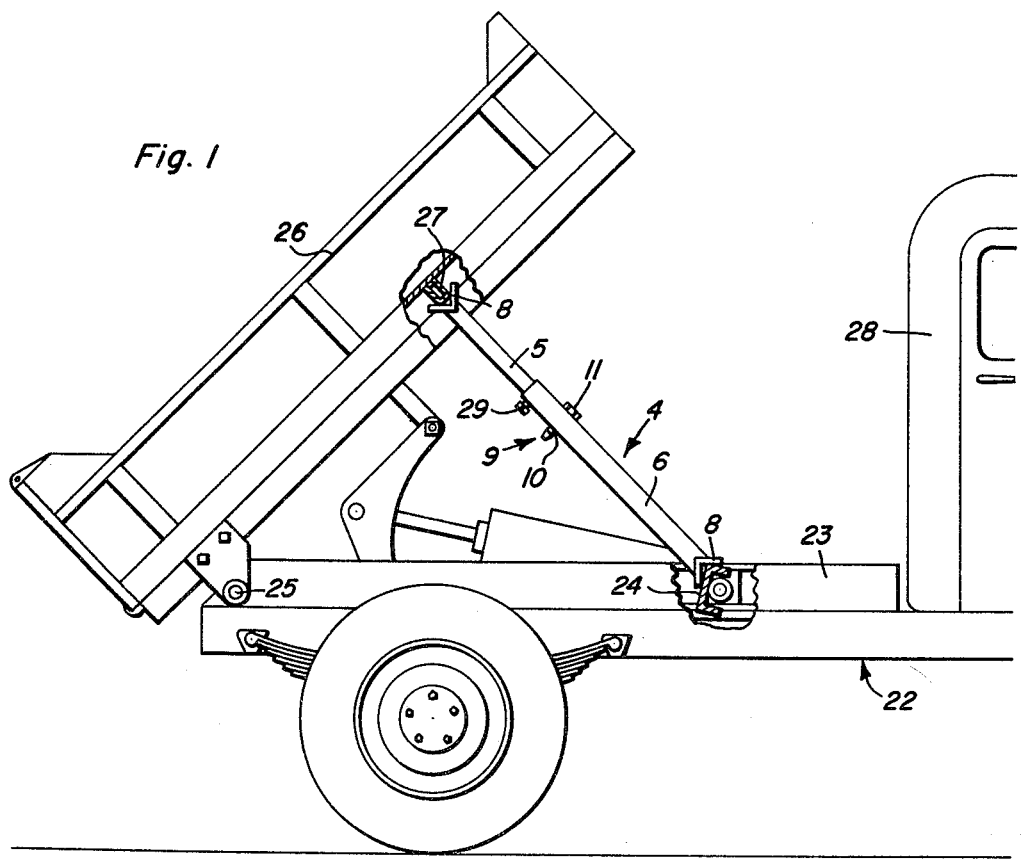
FIGURE 1 is a view in side elevation, showing a safety prop constructed in accordance with the present invention in use on a dump truck, portions of said truck being broken away in section.
Figure 2:
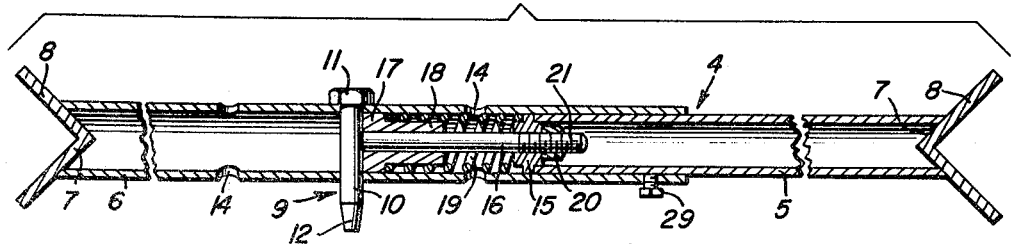
FIGURE 2 is a view in longitudinal section through the device.
Figure 3:
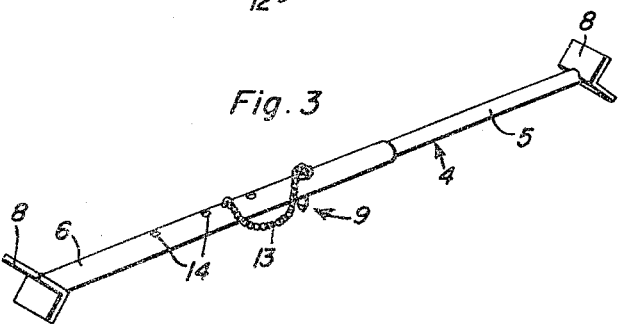
FIGURE 3 is a perspective view of the safety prop.

Referring now to the drawing in detail, it will be seen that the embodiment of the present invention which has been illustrated comprises a telescopically adjustable post or bar of suitable metal or other material which is designated generally by reference numeral 4. The post 4, which may also be of any desired dimensions, includes a pair of telescopic inner or male and outer or female sections 5 and 6, respectively. The outer ends of the sections 5 and 6 have formed therein generally V-shaped notches or recesses 7 and fixed transversely therein are heads 8 in the form of angle irons or bars.

The telescopic adjustment of the post 4 is retained by means comprising a removable pin 9. The pin 9 comprises a shank 10 having a head 11 on one end. The other end portion of the shank 10 is tapered, as indicated at 12. A chain 13 tethers the pin 9 to the female post section 6 to prevent loss of said pin. The pin 9 is insertable selectively in openings 14 which are provided therefor at longitudinally spaced points in the section 6.

Affixed to the inner end portion of the male section 5 of the post or bar 4 is a circumferentially flanged collar or seat 15. A longitudinal bolt 16 is slidable through the seat 15. One end of the bolt 16 is adapted to abut the pin 9 and affixed thereon as by welding is a head 17 comprising a reduced neck portion 18. Encircling the bolt 16 in the section 6 is a coil spring 19. One end portion of the coil spring 19 abuts the seat 15. The other end portion of the spring 19 encircles the neck 18 and abuts the head 17. Thus, inward sliding movement of the male section 5 of the post 4 is yieldingly resisted. A nut 20 is threaded on the end portion 21 of the bolt 16 and is engaged with the collar 15 for regulating the tension of the spring 19.

In FIGURE 1 of the drawing, reference numeral 22 designates generally a conventional dump truck. The vehicle 22 comprises the usual bed 23 including a cross member 24. Hingedly mounted as at 25 on the rear end portion of the bed 23 is a vertically swingable dump body 26. The bottom structure of the dump body 26 comprises several cross members, as indicated at 27. The cab of the truck is indicated at 28.

It is thought that the use of the device will be readily apparent from a consideration of the foregoing. Briefly, through the medium of the pin 9, the male section 5 is adjusted to the desired position in the female section 6, said pin being inserted in the appropriate openings 14. When the device is thus adjusted to the desired length, the headed end of the bolt 16 rests on the pin 9. With the body 26 elevated as shown the post 4 is shortened against the tension of the spring 19 and frictionally secured through the medium of a setscrew 29 threaded through the inner end portion of the member 6 and engaged with the member 5. The lower head 8 is seated on the member 24 of the truck, the upper head 8 is positioned to engage the member 27 and the setscrew 29 is loosened, thus permitting the spring 19 to expand for lengthening the post 4 for yieldingly engaging said heads 8 with said members 24 and 27 for retaining the device in position in an obvious manner. The body 26 is then lowered until arrested by the post 4 by which said body is now supported in elevated position, the bolt 16 resting on the pin 9.

When the body 26 is lowered to be supported by the post 4, the collar or seat 15 slides downwardly on the bolt 16 and rests on the upper end portion of the neck or sleeve 18 for positively supporting the body. To remove the prop the foregoing procedure is substantially reversed. While the device is primarily intended for the use described, it will be understood, of course, that said device may be used for any other purpose for which it may be found adapted and desirable such, for example, as a safety prop under a service station or garage hoist, for supporting a vehicle body on a hoist for permitting the rear axle to be lowered for removing the rear wheels from beneath fenders, under loader buckets and bulldozer blades, for holding up mower bars, etc. Also, the device may be produced in various sizes for the different uses to which it may be put. It also will be noted that the sections 5 and 6 may be rotated relatively to each other whereby the heads 8 may be relatively turned to meet various conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety prop comprising an extensible and contractible post including telescopically adjustable directly engaged male and female sections, means for yieldingly resisting relative inward sliding movement of said sections, said means including a pin mounted transversely in one of the sections, a headed rod slidable longitudinally on the other section and engageable with the pin, and a coil spring on the rod engaged between the head thereof and the inner end of said other section to be compressed thereby.

2. A safety prop in accordance with claim 1, said one section having longitudinally spaced holes therein, said pin being removable and insertable selectively in the holes for varying the length of the post.

3. A safety prop in accordance with claim 2, and an annular seat for one end of the spring mounted on the inner end of said other section and slidably receiving the rod therethrough.

4. The combination of claim 3, together with a nut threaded on one end portion of the rod and engaged with the spring seat for longitudinally adjusting said rod for regulating the tension of the spring.

5. For use in combination with a dump truck of the type having a frame and the pivotal load carrying body so that the load carrying body may be retained in elevated position without danger of injury due to accidental sudden return of the load carrying body to a lowered position, a prop structure comprising a pair of elongated telescopic members, each of said telescopic members being tubular and having transversely extending V-shaped notches in the end thereof, outwardly opening V-shaped heads secured in said notches with the apex of the V-shaped head being generally disposed on the longitudinal axis of the tubular members, the outer of said tubular members having a plurality of longitudinally spaced apertures extending therethrough, a removable pin insertable in a selective aperture, the inner of said telescopic member being continuously engaged telescopically with the outer of the telescopic members, setscrew means extending through the end portion of the outer telescopic member remote from the head for securing the inner telescopic member within the outer telescopic member, the inner end of the inner telescopic member having a shouldered fitting mounted thereon, a rod slidable through the shouldered fitting along the longitudinal axis of the tubular member, said rod having an enlarged end within the inner tubular member for retaining the rod connected with the fitting, a shouldered head connected to the end of the rod remote from the inner telescopic member and including a generally flat axially outer surface engaging the removable pin in the outer telescopic member, a compression coil spring disposed between the shouldered head on the rod and the shouldered fitting in the end of the inner telescopic member for urging the rod and shouldered head thereon outwardly of the inner telescopic member and being compressible to enable the over-all length of the top to be varied so that the heads may be engaged with the frame and load carrying body of the dump truck for retaining the telescopic member resiliently engaged therewith with the cam preventing inward movement of the head on the rod thereby limiting relative inward movement of the inner telescopic member in relation to the outer telescopic member, said spring being continuously retained within the confines of the outer telescopic member and engaged thereby to prevent lateral buckling.

6. The structure as defined in claim 5 wherein said shouldered head and shouldered fitting having a portion extending telescopically into the coil spring for guiding the same and forming abutment surfaces for limiting the inward movement of the inner telescopic member.

References Cited in the file of this patent

UNITED STATES PATENTS

| | | |
|---|---|---|
| 418,378 | McAlpine | Dec. 31, 1889 |
| 1,768,206 | Lemons et al. | June 24, 1930 |
| 1,809,401 | Cottell | June 9, 1931 |
| 2,583,945 | Jacobs | Jan. 29, 1952 |
| 2,820,626 | Hedeen | Jan. 21, 1958 |
| 2,937,842 | Meek | May 24, 1960 |
| 2,979,304 | Teel | Apr. 11, 1961 |

FOREIGN PATENTS

| | | |
|---|---|---|
| 8,656 (Addition) | France | Mar. 21, 1908 |
| 796,701 | Great Britain | June 18, 1958 |

CLAUDE A. LE ROY, *Primary Examiner.*